(12) United States Patent
Wu

(10) Patent No.: US 7,726,908 B2
(45) Date of Patent: Jun. 1, 2010

(54) SOLID WASTE TREATMENT PROCESS

(76) Inventor: Xu Fei Wu, 584 Royal Beech Drive, Waterloo, Ontario (CA) N2T 1B8

(*) Notice: Subject to any disclaimer, the term of this patent is extended or adjusted under 35 U.S.C. 154(b) by 15 days.

(21) Appl. No.: 11/962,206

(22) Filed: Dec. 21, 2007

(65) Prior Publication Data
US 2008/0166184 A1      Jul. 10, 2008

(30) Foreign Application Priority Data
Jan. 5, 2007    (CN) ................. 2007 1 0017205

(51) Int. Cl.
*B09B 1/00* (2006.01)
(52) U.S. Cl. .................................. 405/129.95
(58) Field of Classification Search ........... 405/129.95, 405/129.9
See application file for complete search history.

(56) References Cited

U.S. PATENT DOCUMENTS

| | | | |
|---|---|---|---|
| 5,054,962 A | | 10/1991 | Bahnmuller et al. |
| 5,090,843 A | * | 2/1992 | Grigsby .............. 405/129.9 |
| 5,320,450 A | | 6/1994 | Smith |
| 5,411,147 A | * | 5/1995 | Bond .................. 209/44.4 |
| 2004/0191755 A1 | * | 9/2004 | Kemper et al. ........... 435/3 |
| 2005/0286978 A1 | * | 12/2005 | Hater et al. ......... 405/129.95 |

FOREIGN PATENT DOCUMENTS

WO      9741977      11/1997

OTHER PUBLICATIONS

Canadian Intellectual Property Office, Office Action for corresponding Canadian Patent Application No. 2616265, Jul. 23, 2009.

* cited by examiner

*Primary Examiner*—John Kreck
(74) *Attorney, Agent, or Firm*—Borden Ladner Gervais LLP; Jeffrey W. Wong

(57) ABSTRACT

This invention involves a Municipal Solid Waste (MSW) treatment processing technology. The process entails a type of MSW landfill treatment process. This invention features the following steps. Firstly: MSW separation. Second: organic trash landfill. Third: the recycling.

15 Claims, 3 Drawing Sheets

SOLID WASTE TREATMENT PROCESS

CROSS REFERENCE TO RELATED APPLICATIONS

This application claims the benefit of priority of Chinese Patent Application No. 200710017205.0 filed Jan. 4, 2007, which is incorporated herein by reference in its entirety.

FIELD OF THE INVENTION

This invention is a newly developed Municipal Solid Waste (MSW) treatment process. This procedure converts sorted biodegradable organic municipal solid waste into high purity methanol through a novel biochemical process.

BACKGROUND OF THE INVENTION

The amount of municipal waste in the past decades has grown at an accelerated rate. Today's products are no longer made to endure but to be disposable. The quality of these products is dictated by the optimal economic life, which is of course determined by its manufacturer. In addition, consumers are becoming less tolerant of old and used products than ever before. As a result, products are thrown out at an unprecedented faster rate. The consequence is that we have overflowing landfill sites.

Historically, the solution is to let the waste accumulate in landfill sites until the site are full, and then a new site is selected. This is a quick and cheap option, and it could be even more efficient if more people followed the "Reduce, Reuse and Recycle" attitude. However, land is becoming more scarce and expensive as the population grows. In addition, the accumulation of landfill sites poses many problems such as the production of hazardous wastes. Two main hazardous byproducts of landfill sites are leachate, a toxic liquid, and landfill gas, a flammable greenhouse gas. Leachate is a strong and unpleasant smelling liquid waste produced from rainwater, underground water and other moisture the landfill waste may contain that soaked is with the garbage. It has a very high chemical oxygen demand making it very difficult and expensive to treat. The landfill gas is a product of anaerobic biodegradation, and it mainly contains methane and carbon dioxide, both of them are main green house gas. The methane is highly flammable and can cause fires and explosions. These byproducts must be addressed with better solution.

To solve these problems, scientists and engineers have developed three primary technologies to process MSW. However, each of them has their own limitations:

1. The sanitary municipal landfill process. This process has combined the leachate collection and treatment system, landfill gas collection system, and in addition, some are also equipped with a landfill gas torch, and thermal or thermal to electricity system as well. The sanitary landfill process also requires clean soil cover daily to prevent further pollution.

Generally speaking, a sanitary landfill process uses a single cell with life cycle between 20-25 years. After this period, the landfill site is sealed and left for another 30 years before it becoming reusable. This is because the biodegradation of the organic trash under the sealed field is still continuing; a cycle that usually takes upwards of 20-30 years or longer, depending on the local climate—especially the temperature and amount of the rainfall. During this cycle, fires and explosions are likely to take place. It may also contribute to ground subsidence. Therefore this site cannot be used effectively for an extensive amount of time, even after the site has been sealed. In this period, the extensive leachate and landfill gas collection and treatment may still be required. Thus, this process creates land resource waste, and continually treatment expenses in order to avoid serious pollution of the underground water source and the air.

2. Municipal solid incineration. In this process, the MSW is incinerated to generate heat or heat to electricity. However, the cost is extremely high (100-168 USD per tonne of MSW). In addition, it produces high carcinogenic substance-dioxins and can cause serious air pollution. Furthermore, the incinerated ash must be treated by a landfill process. The incineration also produces massive amount of greenhouse gases. As the recycling program is gaining popularity, the thermal value of the MSW to be incinerated will decrease further because the plastic, paper, fabric, rubber etc will be sorted out and sent for recycling, the cost of incineration will be even higher since a larger amount of additional fuel is required.

3. Municipal solid waste compost technology. In this process, the MSW must be well sorted and the un-recyclable organic trash is used to produce fertilizer. This process produces extensive amount of greenhouse gases. Moreover, since the high-temperature fermentation is very costly, the medium and the low temperature fermentations process are often being employed. As a result, this process requires much more time, and the medium and low temperature fermentation process is unable to thoroughly extinguish the bacteria and viruses, so it may lead to contamination of farms, crops and the human food chain.

SUMMARY OF THE INVENTION

This invention provides a new MSW treatment process. It overcomes existing technology shortfalls with reduced cost and it will eliminate significantly the secondary pollution. FIG. 1—The flow chart has outlined the new process.

This method begins with strategically sorting out MSW so the biodegradable organic content (about 50% or less of total MSW) can be separated from the solid waste.

After the biodegradable organic content is isolated, it is put into the landfill cell. Then the agricultural and landscaping waste (straw, tree branches and leaves etc.) are spread evenly on top to form another layer. The process then will be followed by spraying the leachate on top of the agricultural and landscaping waste layer. After this, a layer of soil is used to cover the site. The above steps will repeated until the landfill cell is full.

The leachate, a liquid waste with high organic content, is used in this process. Because of its high organic content, the moisture and the abundance of bacteria, the circulation of leachate throughout the landfill will further catalyze the process of landfill gas production by increasing the content of landfill organics and its moisture along with bacteria proliferation.

The agricultural/landscaping waste in the landfill also increases the organic content and the moisture of the trash. In addition, the agricultural and landscaping waste layer acts as a medium filter layer to further treat leachate by filtering out the suspended solids to avoid build up in the leachate and to improve the leachate circulation. Hence, in this process by using agricultural waste, it will catalyze the landfill gas production while limiting environmental pollution.

BRIEF DESCRIPTION OF THE DRAWINGS

Embodiments of the present invention will now be described, by way of example only, with reference to the attached Figures, wherein.

DETAILED DESCRIPTION

Figure 1:
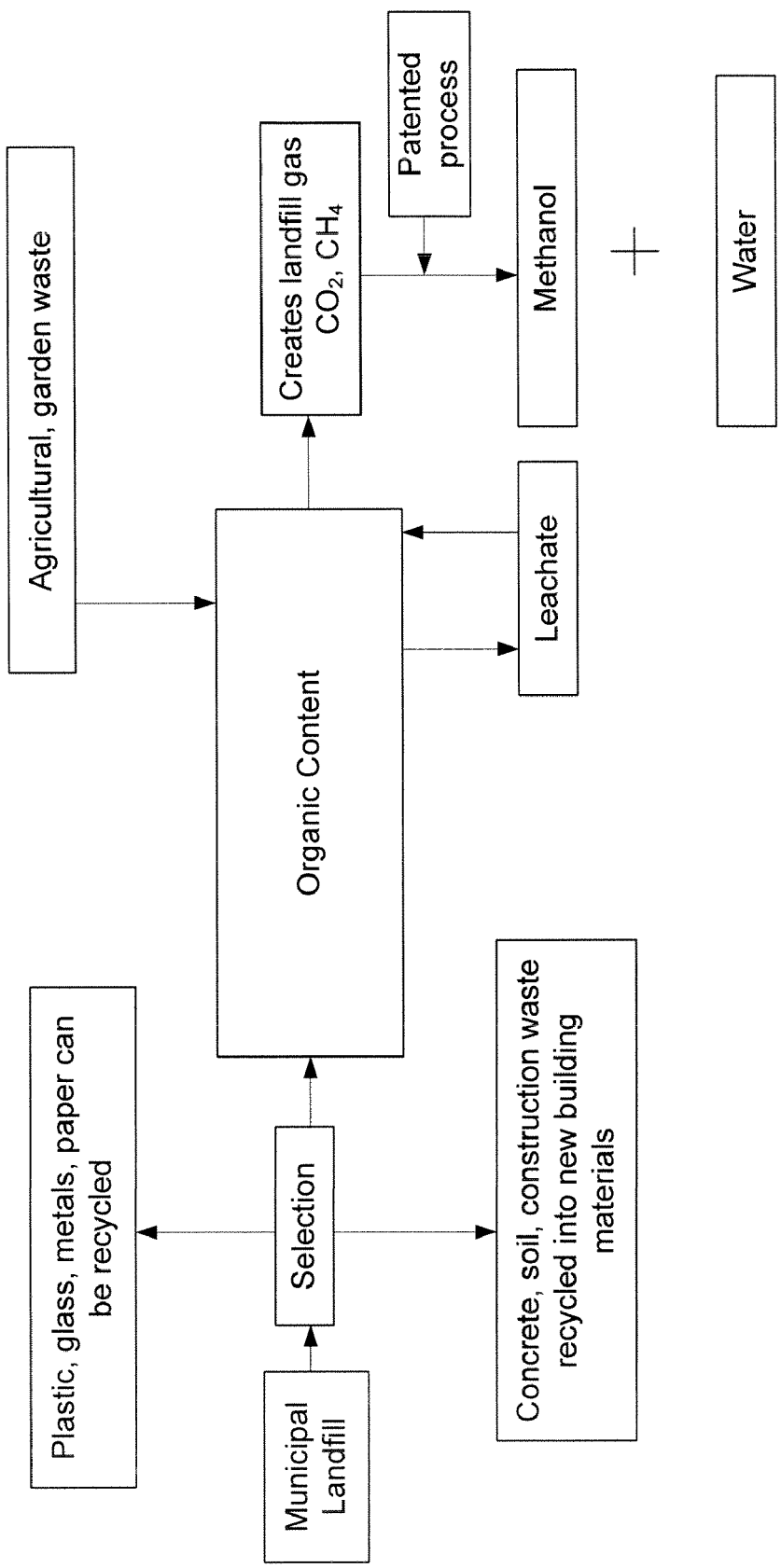
FIG. 1 is a schematic diagram a solid waste treatment system.
Figure 2:
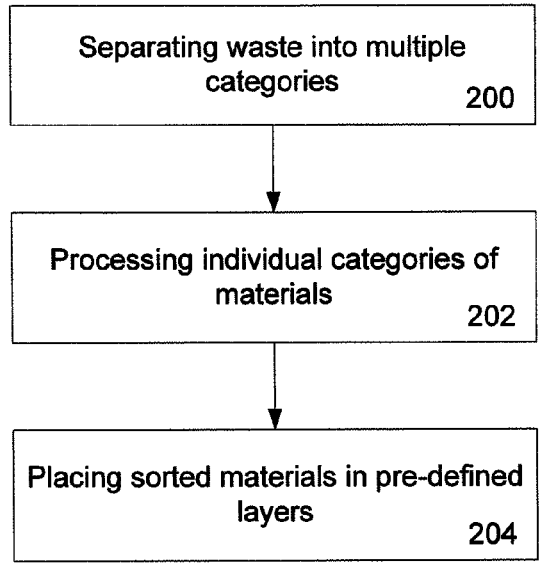
FIG. 2 is a flowchart outlining a method of solid waste treatment.

Turning to FIGS. 1 and 2, a system and method of solid waste treatment is shown. As will be understood, although the current application discusses a solution for municipal solid waste, it will be understood that this is a solution can be applied to the treatment of solid waste. Firstly, the municipal solid waste, or solid waste (MSW) is sorted and separated so that the solid waste is separated into categories such as A) Recyclable materials; B) Reusable materials; C) Inhibitors and D) Biodegradable organic trash for the landfill (step 200).

The separated materials are then further processed into small categories (step 202). The recyclable materials include, but are not limited to, paper, plastic, metal, fiber, rubber, glass etc. The sorted material will be put up for recycling. Reusable materials include, but are not limited to, wood, soil, ash, brick, concrete etc. The wood can be cut into chips and mixed with agriculture and landscaping waste for the landfill layer and the soil, ash, brick and concrete can be broken into smaller pieces (1.5-2-5 cm) and mixed with cover soil to be used in the process. Inhibitors, like batteries, chemicals etc. can be sorted for further treatment. Finally, the sorted materials are placed in pre-defined layers in a pre-determined location (step 204).

Figure 3:
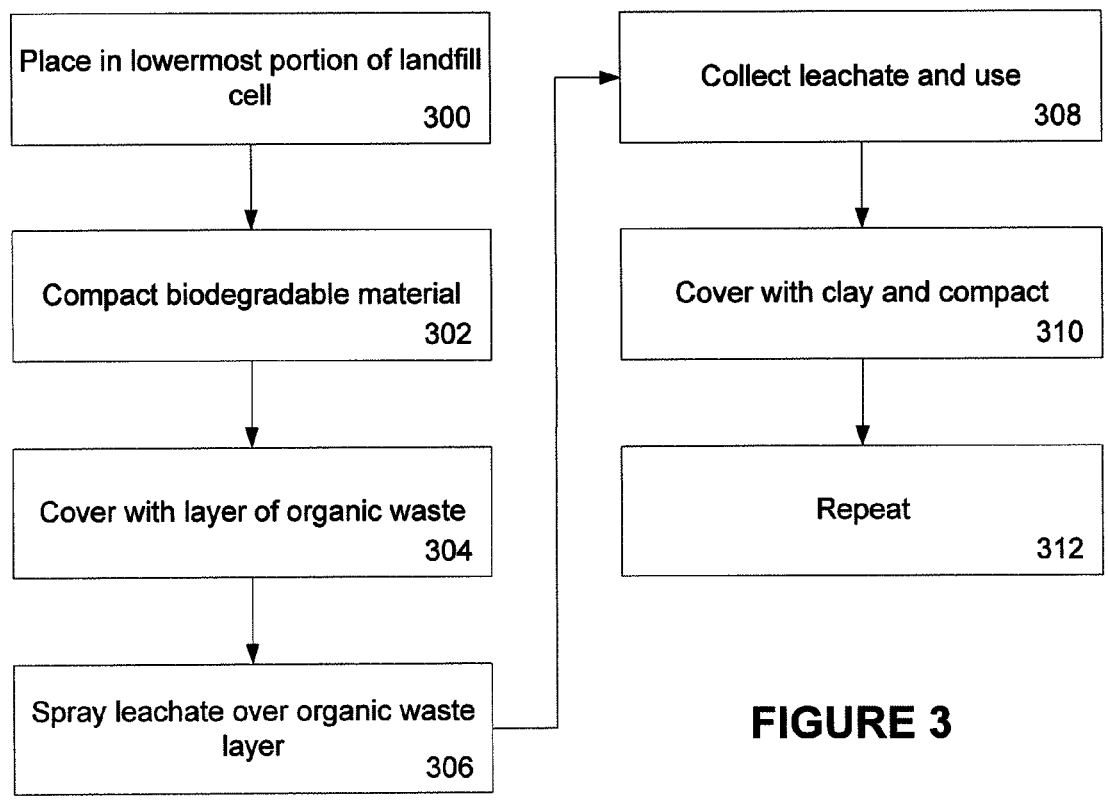
FIG. 3 is a flowchart outlining a method of handling the solid waste at the landfill site.

As outlined in FIG. 3, once the biodegradable organic trash is delivered to the landfill, the biodegradable organic trash will be placed in the lower part of the landfill site cell (step 300). The depth of the landfill cell depends on the shape and size of the landfill site. A narrow and deep cell is preferred. In a preferred embodiment, the depth of organic trash layer is two to five meters. The site cell is made waterproof by a liner which guards the structure against leakage. Next, organic trash is compacted (step 302) and then covered with a layer of agriculture and landscaping waste on the top of organic trash (step 304). In a preferred embodiment, the agricultural and garden waste layer is five to fifteen centimeters, however, the depth of agricultural and landscape waste layer is determined by the availability and the price of the waste. If the time and price are right, maximize the depth of this layer. Agricultural and garden waste includes plant stems, branches, leaves, roots etc.

The leachate recycling process is then commenced by spray a layer of leachate evenly on top of the agricultural and landscaping waste layer (step 306). The leachate is the collected (step 308) and ideally used the same day in order to reduce air pollution. The waste layer is then cover with soils, or clay and compact (step 310). In the preferred embodiment, the cover soil layer after compaction is ten to fifteen centimeters The process is then repeated as many times as required (step 312).

The leachate recycling process not only avoids the complexity and soaring cost of current leachate treatment processes, but also it increases organic, moisture and bacteria content of the landfill. Therefore, this process acts as a catalyst for the biodegradation process. It increases the landfill gas production rate and reduces landfill sites turn around time.

In order to produce methanol, the landfill gas collected and extracted will be sent to the chemical production facility to produce methanol or Di-Methyl-Ether (DME). The quantity of landfill gas emissions will be monitored closely. In the early stage, the gas can be collected and sent for flaring. When the gas emissions reached the desired levels, extraction and chemical manufacturing will be started. The landfill gas is principally composed of methane and carbon dioxide, but the purification may be required prior the chemical manufacturing process. After purification, they will be sent for production of methanol or DME.

The current invention provides for many advantages over the prior art. Firstly there is a lower cost associated with the process. This process avoids the costly and complicated leachate treatment process used to enhance the biodegradation process. It also produces a useful material—methanol, by using a waste byproduct-landfill gas. Secondly, the process provides effective treatment results and eliminates secondary pollution. The process uses nearly 100% of the landfill gas emissions including both methane and $CO_2$ to produce methanol. This process will only release a very small amount $CO_2$. It has effectively solved the difficult problem of leachate treatment process, while reducing environmental pollution. All parts of agricultural and landscaping waste (stem, roots, leaves, branches etc.) will be used in this invention and assists in reducing the pollution created through farm field incineration. The agriculture waste layer also works as a medium filter to treat the leachate by removing suspended solids from it to avoid solid build up as the leachate being circulated. This layer can also further accelerate the overall biodegradation process by holding more moisture and bacteria.

Another advantage is that the process produces methanol by taking landfill gas composed mainly of methane and carbon dioxide, as raw materials. This process has revolutionized the landfill process in the aspects of social and economy. Also, the process solves land occupancy issues which is especially crucial in high populated areas. Instead of traditionally using only one large cell per site, this process uses multiple smaller cells that will be arranged in U shape with a methanol manufacturing station in a central location. Each cell is designed to be filled up in approximately 5 years period. There will be several cells in rotation for landfill and methanol production. Among them, some have completed its cycle and are ready to be refilled again and at least one is still in the process of filling up.

The process of cell use can be explained as follows:

Each cell is filled up according to a schedule whereby the cells are used a certain time period apart. When the earliest filled cell has completed its biodegradation process, it is cleaned and ready to be refilled while other cells are going through and completing the biodegradation process. It should be also pointed out that the soil that is taken out the landfill cell in the cleaning process can be used again as cover soil for the other cells. Before the last cell is filled up, the previously filled cells are completing their biodegradation and gas production process and are ready to be refilled again. The number and the size of landfill cells will be determined by the local climate and the quantity and type the of the MSW. This way, we can ensure there will be always an empty cell available for the waste. Therefore, the need for continuously purchasing land for a new landfill can be eliminated.

Because the biodegradation process relies heavily on local climate, especially temperature and precipitation, the biodegradation process of each cell may vary from 8 to 10 years. The process is designed with consideration of these factors.

Figure 4:
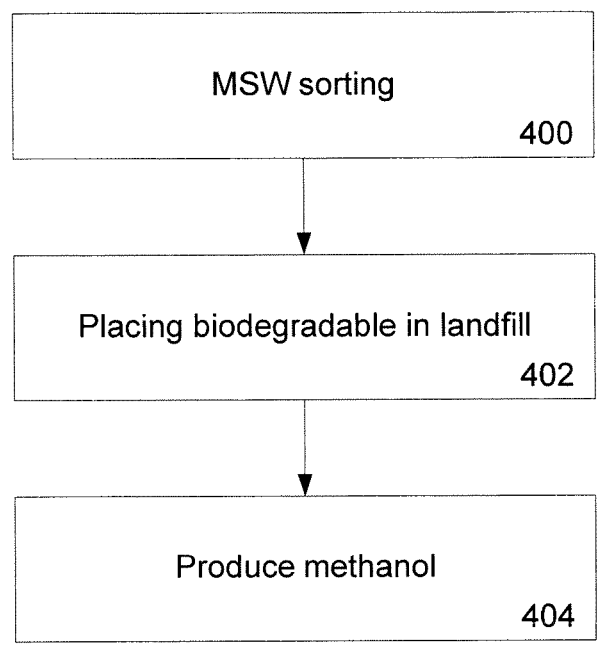
FIG. 4 is a flowchart outlining a second embodiment of solid waste treatment.

Turning to FIG. 4, a second embodiment of a method of treating solid waste is shown. Firstly the solid waste is sorted (step 400) and then the biodegradable materials is placed in a landfill (step 402). The biodegradable materials can then be used to produce methanol (step 404).

Yet a further advantage is a reduction of landfill quantity. Since this process only takes biodegradable organic trash sorted, which is about 50% or less of total MSW volume for landfill, it can reduce the size of landfill sites to half. Since all of the landfill materials can be converted into landfill gas, therefore, the landfill cell can be used repeatedly.

Compared with standard sanitary landfill technology, this process only landfill sorted biodegradable organic trash. Instead of using only one cell per site as traditional landfill techniques employ, this invention uses multiple cells. This process characterized with lower cost, higher processing effect results, highly efficient in economical and land resources aspects and it will avoid secondary pollution.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of treating solid waste comprising:
separating the solid waste into multiple categories, wherein the multiple categories include recyclable materials, reusable materials, agricultural and landscape waste, inhibitors and biodegradable organic trash;
individually processing the multiple categories by material;
placing a layer of biodegradable organic trash within a landfill cell;
compacting the biodegradable organic trash;
covering the layer of biodegradable organic trash with an agricultural and landscape waste layer;
spraying leachate over the agricultural and landscape waste layer;
collecting the leachate for recycling and respraying; and
covering the organic waste with a primary covering material layer.

2. The method of treating solid waste of claim 1 wherein the primary covering material is selected from soil, ash, brick, concrete, clay, or any combination thereof.

3. The method of treating solid waste of claim 1 wherein the landfill cell is waterproof.

4. The method of treating solid waste of claim 3, wherein the primary covering material is selected from soil, ash, brick, concrete, clay, or any combination thereof.

5. A method of treating solid waste comprising:
providing a plurality of available landfill cells;
separating the solid waste into multiple categories, wherein the multiple categories include recyclable materials, reusable materials, agricultural and landscape waste, inhibitors and biodegradable organic trash;
individually processing the multiple categories by material;
placing a layer of the biodegradable organic trash in an available landfill cell;
compacting the biodegradable organic trash;
covering the layer of biodegradable organic trash with an agricultural and landscape waste layer;
spraying leachate over the agricultural and landscape waste layer;
collecting the leachate for recycling and resraying;
covering the organic waste with a primary covering material layer;
repeating the layers of biodegradable organic trash, agricultural and landscape waste and primary covering material until the available landfill cell is full;
designating a full landfill cell as unavailable; and
designating an unavailable landfill cell as available once the contents of the unavailable landfill cell have biodegraded.

6. The method of treating solid waste of claim 5 wherein the primary covering material is selected from soil, ash, brick, concrete, clay, or any combination thereof.

7. The method of treating solid waste of claim 1, wherein the agricultural and landscaping waste layer includes branches, leaves, roots, wood chips and other organic waste.

8. The method of treating solid waste of claim 1, wherein the biodegradable organic trash layer is between two to five meters in depth prior to being compacted.

9. The method of treating solid waste of claim 1, wherein the agricultural and landscape waste layer is between five to fifteen centimeters in depth.

10. The method of treating solid waste of claim 1, wherein the primary covering material layer is ten to fifteen centimeters in depth.

11. The method of treating solid waste of claim 5, wherein the agricultural and landscaping waste layer includes branches, leaves, roots, wood chips and other organic waste.

12. The method of treating solid waste of claim 5, wherein the biodegradable organic trash layer is between two to five meters in depth prior to being compacted.

13. The method of treating solid waste of claim 5, wherein the agricultural and landscape waste layer is between five to fifteen centimeters in depth.

14. The method of treating solid waste of claim 5, wherein the primary covering material layer is ten to fifteen centimeters in depth.

15. The method of treating solid waste of claim 5, wherein at all times there is at least one landfill cell that is designated as an available landfill cell.

* * * * *